US009139209B2

(12) United States Patent
Smileski et al.

(10) Patent No.: US 9,139,209 B2
(45) Date of Patent: Sep. 22, 2015

(54) DERAILMENT DETECTOR (71) Applicant: Wabtec Holding Corp., Wilmerding, PA (US)

(72) Inventors: Tasko Smileski, Skopje (MK); Stojche Smileski, Skopje (MK); Marjan Savevski, Skopje (MK)

(73) Assignee: Wabtec Holding Corp., Wilmerding, PA (US)

( * ) Notice: Subject to any disclaimer, the term of this patent is extended or adjusted under 35 U.S.C. 154(b) by 135 days.

(21) Appl. No.: 13/803,373

(22) Filed: Mar. 14, 2013

(65) Prior Publication Data

US 2014/0263859 A1 Sep. 18, 2014

(51) Int. Cl.
*B61L 15/00* (2006.01)
*B60T 7/12* (2006.01)
*B60T 15/36* (2006.01)

(52) U.S. Cl.
CPC ............. *B61L 15/0081* (2013.01); *B60T 7/124* (2013.01); *B60T 15/36* (2013.01)

(58) Field of Classification Search
CPC ... B61L 15/0081; B60T 17/228; B60T 17/42; B60T 17/18; B60T 17/12; B60T 15/024; B60T 7/124; B60T 7/12; B61B 10/04; B61F 9/00
USPC .................................................. 246/170–173
See application file for complete search history.

(56) References Cited

U.S. PATENT DOCUMENTS

| 532,795 | A | | 1/1895 | Lemp | |
|---|---|---|---|---|---|
| 739,918 | A | | 9/1903 | Parke | |
| 788,744 | A | * | 5/1905 | Wright | .......................... 246/172 |
| RE12,780 | E | | 4/1908 | Godley | |
| 909,320 | A | * | 1/1909 | McPherson | ................... 246/173 |
| 998,513 | A | | 7/1911 | Hill | |
| 1,024,331 | A | | 4/1912 | Gyllenberg | |
| 1,042,869 | A | | 10/1912 | Beattie | |
| 1,052,869 | A | | 2/1913 | Wheelock | |
| 1,353,794 | A | | 9/1920 | Smith | |
| 1,412,141 | A | | 4/1922 | Scott | |
| 1,533,632 | A | | 4/1925 | Butorac | |
| 1,556,839 | A | | 10/1925 | Johnson | |
| 1,578,984 | A | | 3/1926 | Gossett | |
| 1,613,252 | A | | 1/1927 | St. Jacques | |
| 1,635,825 | A | * | 7/1927 | Eakin | ............................ 246/171 |

(Continued)

FOREIGN PATENT DOCUMENTS

| DE | 102009056931 A1 | 6/2011 |
|---|---|---|
| KR | 101313802 B1 | 10/2013 |

*Primary Examiner* — Jason C Smith (74) *Attorney, Agent, or Firm* — The Webb Law Firm (57) ABSTRACT

A derailment detector for a railway vehicle includes a housing in selective fluid communication with a brake pipe of the railway vehicle to receive compressed air from a pneumatic braking system. A main chamber is disposed within the housing and pressurized by the compressed air. A shock detection assembly is adapted for detecting an acceleration indicative of a derailment condition and activating a main valve disposed within the main chamber upon detection of the acceleration indicative of the derailment condition. A discharge valve is in selective fluid communication with the main chamber, where, upon detection of the acceleration indicative of the derailment condition, the discharge valve is operative for discharging a predetermined amount of the compressed air from the main chamber to indicate that the derailment condition has occurred.

19 Claims, 3 Drawing Sheets

(56) References Cited

U.S. PATENT DOCUMENTS

| | | |
|---|---|---|
| 1,825,903 A | 10/1931 | Gloster |
| 2,456,286 A | 12/1948 | Kennelly |
| 2,656,145 A | 10/1953 | Lawson |
| 2,694,777 A * | 11/1954 | Phillips ............... 246/171 |
| 3,288,992 A * | 11/1966 | Matsudaira et al. ....... 246/173 |
| 3,889,905 A | 6/1975 | Hall, Jr. |
| 3,921,945 A * | 11/1975 | Swaim ............... 246/169 R |
| 3,929,308 A | 12/1975 | Armstrong et al. |
| 3,938,765 A * | 2/1976 | Cope ................. 246/172 |
| 3,994,459 A * | 11/1976 | Miller et al. ........... 246/173 |
| 4,269,288 A | 5/1981 | Collins |
| 4,286,763 A * | 9/1981 | Hayden ............... 246/172 |
| 4,339,997 A | 7/1982 | Chiles |
| 4,783,028 A * | 11/1988 | Olson ................ 246/170 |
| 5,188,038 A | 2/1993 | Shanley |
| 6,411,870 B1 * | 6/2002 | Sato .................. 701/19 |
| 6,860,453 B2 | 3/2005 | Moretti et al. |
| 6,895,324 B2 | 5/2005 | Straub |
| 7,461,599 B2 * | 12/2008 | Hachikawa ........... 104/242 |
| 7,937,192 B2 * | 5/2011 | Lueger et al. ........... 701/19 |
| 8,262,172 B2 * | 9/2012 | Jimenez ................ 303/7 |
| 2002/0139903 A1 * | 10/2002 | Nico et al. ............ 246/170 |
| 2008/0190713 A1 * | 8/2008 | Jimenez ................ 188/33 |
| 2012/0126066 A1 * | 5/2012 | Consoli ............... 246/170 |
| 2014/0263859 A1 * | 9/2014 | Smileski et al. ........ 246/173 |

* cited by examiner

DERAILMENT DETECTOR

BACKGROUND OF THE INVENTION

1. Field of the Invention

This disclosure relates generally to a derailment detector and method and, particularly, to a derailment detector and a method for detecting and signaling a derailment condition in a railway vehicle.

2. Description of Related Art

Derailments in the rail industry often result in substantial damage to railway vehicles and tracks, as well as a significant loss in revenue to operators due to the derailed railway vehicle and/or the track being out of operation. The serious consequences resulting from the derailment of railway vehicles have led to the development of derailment detectors adapted to detect a derailment of the railway vehicle and immediately apply the appropriate corrective measure. Conventional derailment detectors typically activate a full emergency brake function upon derailment detection. While the ultimate goal in a derailment situation is to stop the railway vehicle as soon as possible, certain situations, such as derailment in a tunnel, on a bridge, or during a false activation, demand an alternative means of initiating the stopping procedure.

In particular, systems based on an inertia sensor are known where, upon activation of the inertia sensor, the pressure inside the brake pipe is quickly released to cause the emergency brake application of the railway vehicle that acts on all cars in the composition. Within the prior art, U.S. Pat. No. 5,188,038 to Shanley is directed to a railroad car derailment safety device that activates the air-brake system immediately upon detection of a derailment condition. The device includes a bar extension projecting from a bottom portion of each car to a position slightly above the rail. Upon railroad car derailment, the bar contacts the rail, causing a trip valve in the air-brake line to open and release the pressure in the brake line, thereby applying the brakes. Derailment detectors of this type function as emergency brace valves.

However, conventional derailment detectors have a major drawback in that full braking force is applied to stop the railway vehicle as quickly as possible in a shortest possible distance. While the ultimate goal is to safely bring the railway vehicle to a complete stop, emergency brake application upon derailment detection can result in the stopping of the railway vehicle in an undesirable location, such as inside a tunnel or on a bridge. This complicates the effort to repair the derailed vehicle and/or the track, and resume normal railway travel.

Certain efforts have been made to develop derailment detectors which alert the operator of the railway vehicle that a derailment condition has occurred. For example, U.S. Pat. No. 3,994,459 to Miller et al. is directed to a railway vehicle derailment detection system having an acceleration responsive device that, in response to the changes in vertical acceleration of the vehicle as a result of the derailment, sends a radio signal installed in the engine to provide a visual or an audio alert to the operator. The acceleration responsive device is embodied as a piezo-electric element that is operative for transmitting an electrical signal when the sensor element is activated as a result of vehicle derailment. The system described in this patent does not include a pneumatic means for providing an indication to the operator that a derailment situation arose.

SUMMARY OF THE INVENTION

While various derailment detectors are known in the railway industry, improved derailment detectors which do not cause an application of emergency brakes are desired. Additionally, improved derailment detectors utilizing the pneumatic system of the railway vehicle are also desired in the railway field. Moreover, the railway industry continues to demand improved derailment detectors having improved structures and economies of manufacture.

In view of the disadvantages associated with the prior art derailment detectors, it is desirable to provide an improved derailment detector that, upon detection of a derailment condition, causes a predetermined reduction in brake pipe pressure to alert the operator that an abnormal operating condition has occurred and that the railway vehicle should be brought to a complete stop at a safe location. While various embodiments of a derailment detector and a method for detecting and signaling a derailment condition in a railway vehicle are described in detail herein, one embodiment of derailment detector for a railway vehicle may include a housing in fluid communication with a brake pipe of the railway vehicle to receive compressed air from a pneumatic braking system. The derailment detector may further include a main chamber disposed within the housing and pressurized by the compressed air. The main chamber may have a main valve. A shock detection assembly may be adapted for detecting an acceleration indicative of a derailment condition to activate the main valve upon detection of the acceleration indicative of the derailment condition. The derailment detector may further include a discharge valve in selective fluid communication with the main chamber. Upon detection of the acceleration indicative of the derailment condition, the discharge valve may be operative for discharging a predetermined amount of the compressed air from the main chamber to indicate that the derailment condition has occurred.

In accordance with another embodiment, the discharge valve may include a signal indicator movable relative to the discharge valve by the discharge of the predetermined amount of pressure to indicate the occurrence of the derailment condition. The predetermined amount of pressure may be 3-8% of total pressure in the pneumatic braking system. In another embodiment, the predetermined amount of pressure may be 5% of the total pressure in the pneumatic braking system. The discharge valve may be adjustable to select the amount of pressure discharged from the pneumatic braking system. The derailment detector may further include an isolation valve to selectively control a flow of compressed air from the brake pipe to the housing.

According to yet another embodiment, the housing may include an upper assembly having the main chamber and a lower assembly having the shock detection assembly. The upper assembly may be in fluid communication with the lower assembly. The shock detection assembly may include a vibrating mass suspended on a spring, the vibrating mass adapted for detecting acceleration in a substantially vertical direction. The vibrating mass may be adjustable to select a vertical acceleration at which the discharge valve is activated.

In another embodiment, a derailment detector may include a discharge valve adapted to discharge a predetermined amount of pressure from a pneumatic braking system of a railway vehicle in response to a detection of an acceleration indicative of a derailment condition. The discharge valve may further include a signal indicator movable relative to the discharge valve by the discharge of the predetermined amount of pressure to indicate the occurrence of the derailment condition. The predetermined amount of pressure may be 3-8% of total pressure in the pneumatic braking system. In one embodiment, the predetermined amount of pressure may be 5% of the total pressure in the pneumatic braking system. The discharge valve may be adjustable to select the amount of pressure discharged from the pneumatic braking system. The discharge valve may be activated by a shock detection assembly adapted for detecting an acceleration indicative of the derailment condition.

In another embodiment, a method of detecting a derailment condition in a railway vehicle and indicating the occurrence of the derailment condition may include the steps of: (a) pressurizing a derailment detector with compressed air; (b) detecting an acceleration indicative of the derailment condition; and (c) discharging a predetermined amount of the compressed air from the derailment detector to indicate the occurrence of the derailment condition. The derailment detector may be pressurized with compressed air received from a pneumatic braking system of the railway vehicle. The acceleration indicative of the derailment condition may be detected by a shock detection assembly. The predetermined amount of compressed air may be discharged through a discharge valve.

These and other features and characteristics of the derailment detector, as well as the methods of manufacture and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DESCRIPTION OF THE PREFERRED EMBODIMENTS

For purposes of the description hereinafter, spatial orientation terms, as used, shall relate to the referenced embodiment as it is oriented in the accompanying drawing figures or otherwise described in the following detailed description. However, it is to be understood that the embodiments described hereinafter may assume many alternative variations and configurations. It is also to be understood that the specific components, devices, and features illustrated in the accompanying drawing figures and described herein are simply exemplary and should not be considered as limiting.

Figure 1:
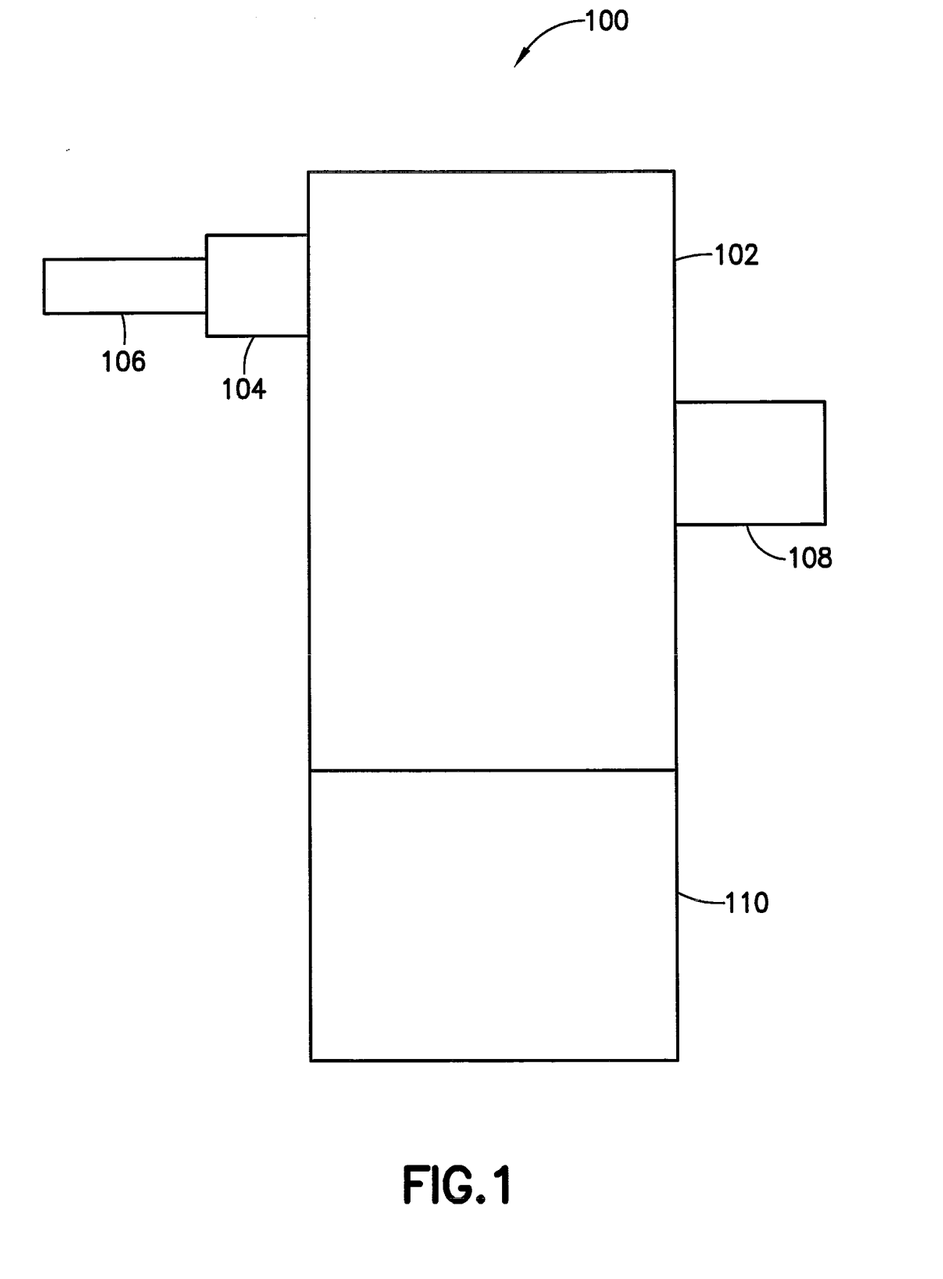
FIG. 1 is a front view of a derailment detector according to one embodiment.

FIG. 1 is a front view of a derailment detector 100 according to one embodiment. The derailment detector 100 is operative for installation on a conventional railway vehicle (not shown) for detecting a derailment condition of the railway vehicle and providing an indication that a derailment condition has occurred. The derailment detector 100 is adapted to, upon detection of a derailment condition, discharge a predetermined percentage of full brake pipe pressure of the pneumatic brake system of the railway vehicle. Desirably, derailment detector 100 lowers the brake pipe pressure to a value where an operator would have a clear indication of a reduction in brake pipe pressure without actually initiating braking. As will be described hereinafter, the discharging of a predetermined percentage of brake pipe pressure is initiated by the activation of derailment detector 100 to pneumatically indicate a derailment condition without activating the brakes of the railway vehicle.

With continuing reference to FIG. 1, derailment detector 100 includes an upper assembly 102 having an isolating valve 104 for connecting the derailment detector 100 to a brake pipe 106. The isolating valve 104 has a first position in which the derailment detector 100 is in fluid communication with the brake pipe 106 to receive compressed air from the brake pipe 106. Isolating valve 104 further has a second position in which the derailment detector 100 is isolated from receiving compressed air from the brake pipe 106. Isolating valve 104 may be manually operated from the first position to the second position. Alternatively, or in addition, the isolating valve 104 may have a powered means, such as an electric, hydraulic, or pneumatic member (not shown) for switching the isolating valve 104 between the first and second positions. The upper assembly 102 further includes a brake pipe discharge valve 108, hereafter referred to as "discharge valve 108". Discharge valve 108 is adapted for venting compressed air within the upper assembly 102 to the atmosphere. Upper assembly 102 receives compressed air from the brake pipe 106 and vents a predetermined percentage of the compressed brake pipe air to the atmosphere upon activation of the derailment detector 100.

With continuing reference to FIG. 1, derailment detector 100 further includes a lower assembly 110 connected to the upper assembly 102 to define the body of the derailment detector 100. The lower assembly 110 defines a shock detection assembly (described with reference to FIGS. 2-3) that activates upon detecting an acceleration resulting from vertical and/or horizontal shock vibrations imposed on the railway vehicle to which the derailment detector 100 is attached. The lower assembly 110 is adapted to cause an activation of the derailment detector 100 after sensing vertical and/or horizontal acceleration equal to or larger than a preselected value or a preselected range of values, as will be described hereafter. The shock detection assembly is adapted not to activate the derailment detector 100 when the vertical and/or horizontal acceleration imposed on the railway vehicle is smaller than a preselected value or a preselected range of values.

Upper assembly 102 and lower assembly 110 are desirably connected to form a unitary structure. As will be described hereafter, one or more fluid passageways may be provided between the upper assembly 102 and the lower assembly 110 for fluidly connecting the upper assembly 102 and the lower assembly 110. Accordingly, it is desirable that upper assembly 102 is connected to the lower assembly 110 in such manner as to maintain a tight fluid connection therebetween and prevent any fluid leakage at the interface between the upper assembly 102 and the lower assembly 110. The upper assembly 102 and the lower assembly 110 may be bolted, welded, glued, or otherwise mechanically fastened to form the body of the derailment detector 100. In another embodiment, the upper assembly 102 and the lower assembly 110 are formed as a single, monolithic structure.

Figure 2:
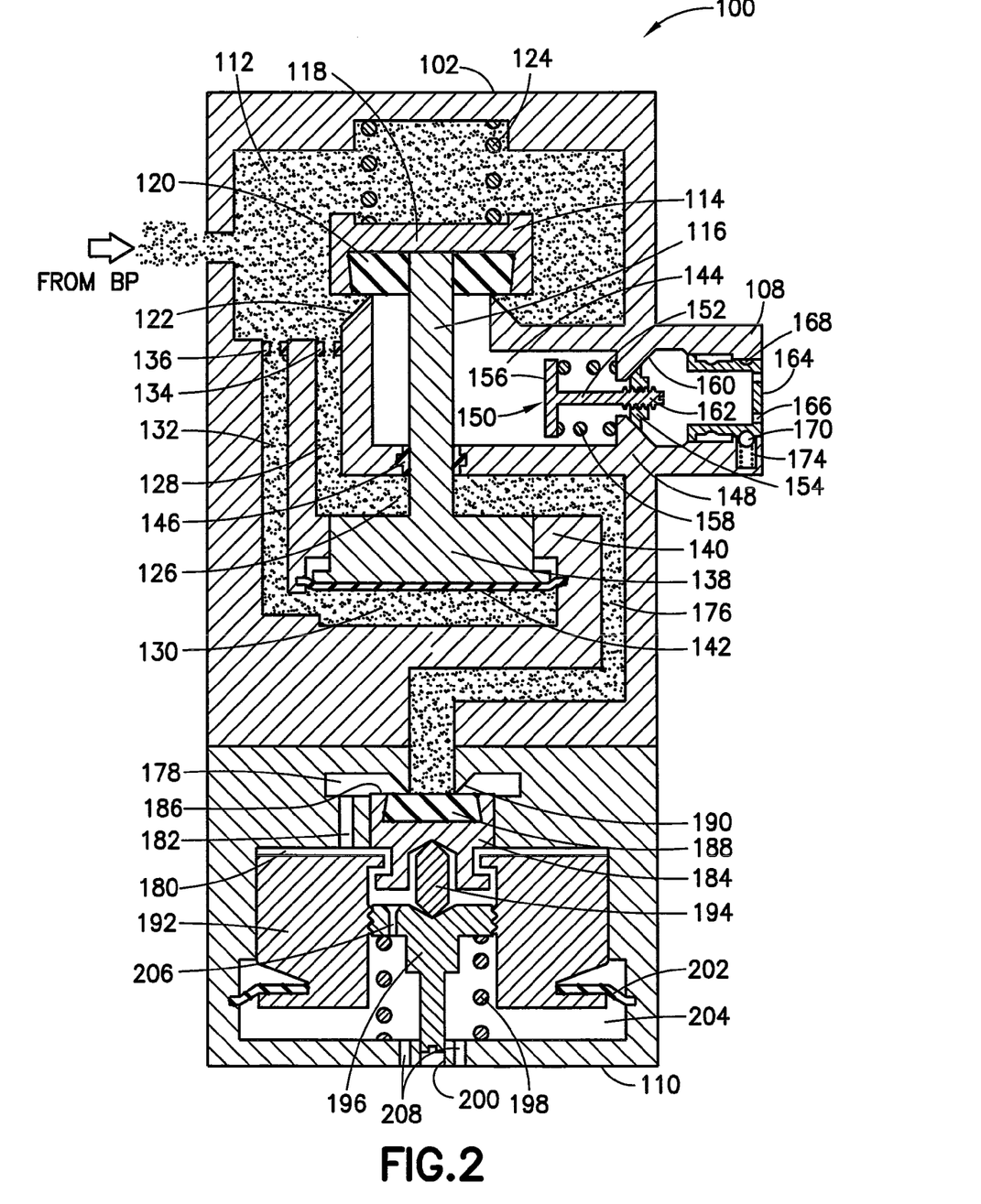
FIG. 2 is a schematic cross-sectional view of the derailment detector of FIG. 1 in a stand-by mode.

With reference to FIG. 2, a schematic cross-sectional view of the derailment detector 100 is shown in a stand-by mode, where the derailment detector 100 is ready to sense vertical and/or horizontal acceleration imposed on the railway vehicle. Upper assembly 102 of derailment detector 100 includes a main chamber 112 in selective fluid communication with the brake pipe 106 through the isolating valve 104 (shown in FIG. 1). The main chamber 112 receives the compressed air from the brake pipe 106 and includes a main valve 114 slidably disposed inside the main chamber 112. The main valve 114 includes a valve rod 116 connected to an upper valve face 118 at an upper portion of the main valve 114. The upper valve face 118 defines an upper surface opposite a lower surface. The lower surface of the upper valve face 118 includes a first sealing element 120, such as a rubber seal. The first sealing element 120 is pressed against a valve seat 122 when main valve 114 is closed to maintain a charge of compressed air within main chamber 112. The upper surface of the upper valve face 118 defines a surface for engaging a first elastic member 124, such as a helical coil spring. The first elastic member 124 is adapted to compress with movement of main valve 114 where the lower surface of the upper valve face 118 extends away from the valve seat 122.

With continuing reference to FIG. 2, main chamber 112 is in fluid connection with an upper chamber 126 through a first pipe 128 and a lower chamber 130 through a second pipe 132. Each of the upper and lower chambers 126, 130 is charged with compressed air from the main chamber 112 through first and second chokes 134, 136, respectively, located at an upper portion of first and second pipes 128, 132, respectively. A lower valve face 138 of the main valve 114 is provided on a lower portion of the valve rod 116 opposite the upper valve face 118. The lower valve face 138 is slidable relative to a wall 140 separating the upper and lower chambers 126, 130. A flexible diaphragm 142 seals the lower valve face 138 against the walls of the lower chamber 130 to prevent leakage of compressed air between upper and lower chambers 126, 130.

Main chamber 112 is in selective fluid communication with an outlet chamber 144 of the discharge valve 108. As will be described hereafter, main chamber 112 is in fluid isolation from outlet chamber 144 when the first sealing element 120 of the upper valve face 118 is seated against valve seat 122. When the first sealing element 120 moves away from the valve seat 122, fluid communication is established between the main chamber 112 and the outlet chamber 144 of the discharge valve 108 such that the outlet chamber 144 receives the compressed air from the main chamber 112. Thus, the main valve 114 is movable within the upper assembly 102 to selectively establish fluid communication with the outlet chamber 144 of the discharge valve 108. An axial seal 146 is provided on a lower wall 148 of the outlet chamber 144 to seal the valve rod 116 and prevent the passage of air between the upper chamber 126 and the outlet chamber 144.

With continuing reference to FIG. 2, outlet chamber 144 of the discharge valve 108 is sealed by the main valve 114 at one end and an outlet valve 150 at the opposite end to vent the compressed air from the main chamber 112 to the atmosphere when the derailment detector 100 is activated. The outlet valve 150 has an outlet valve rod 152 with an outlet valve face 154 provided at its first end and a spring retention member 156 at its second end. The spring retention member 156 retains a second elastic member 158, such as a helical coil spring, against a first end of the outlet valve seat 160. The spring retention member 156 also defines a surface against which the compressed air acts to activate the outlet valve 150. The second end of the outlet valve seat 160 selectively engages the outlet valve face 154 when the derailment detector 100 is activated.

The outlet valve rod 152 includes a threaded end 162 to threadably receive the outlet valve face 154. The threaded connection between the outlet valve rod 152 and the outlet valve face 154 permits the adjustment of the length of the outlet valve rod 152 and a relative separation between the outlet valve face 154 and the spring retention member 156. By threading the outlet valve face 154 toward the spring retention member 156, the second elastic member 158 is compressed between the spring retention member 156 and an outer surface of the outlet valve seat 160. Compressing the second elastic member 158 increases the stiffness of the outlet valve 150 and increases the pressure necessary to cause the outlet valve face 154 to move away from the outlet valve seat 160 to allow the passage of compressed air to the atmosphere. Conversely, decompressing the second elastic member 158 reduces the stiffness of the outlet valve 150 and decreases the pressure necessary to cause the outlet valve face 154 to move away from the outlet valve seat 160 to vent the compressed air to the atmosphere. Thus, the adjustability of the outlet valve 150 allows for selecting a desired pressure necessary to open the outlet valve 150. In one embodiment, the stiffness of the outlet valve 150 is set to cause the outlet valve 150 to open at a pressure sufficient to vent 5% of the total pressure from the main chamber 112. Because the main chamber 112 receives the compressed air from the brake pipe 106, the outlet valve 150 also vents 5% of the total brake pipe pressure during normal operation. In another embodiment, the stiffness of the outlet valve 150 is selected to vent between 3-8% of total brake pipe pressure. Desirably, less than 10% of total brake pipe pressure is vented through the outlet valve 150 because such pressure drop would necessarily cause an application of the brakes of the railway vehicle. The derailment detector 100 is adapted for releasing a predetermined percentage of brake pipe pressure to give an indication that the derailment detector 100 has been activated, but not release a percentage of brake pipe pressure sufficient to affect braking of the railway vehicle.

Figure 3:
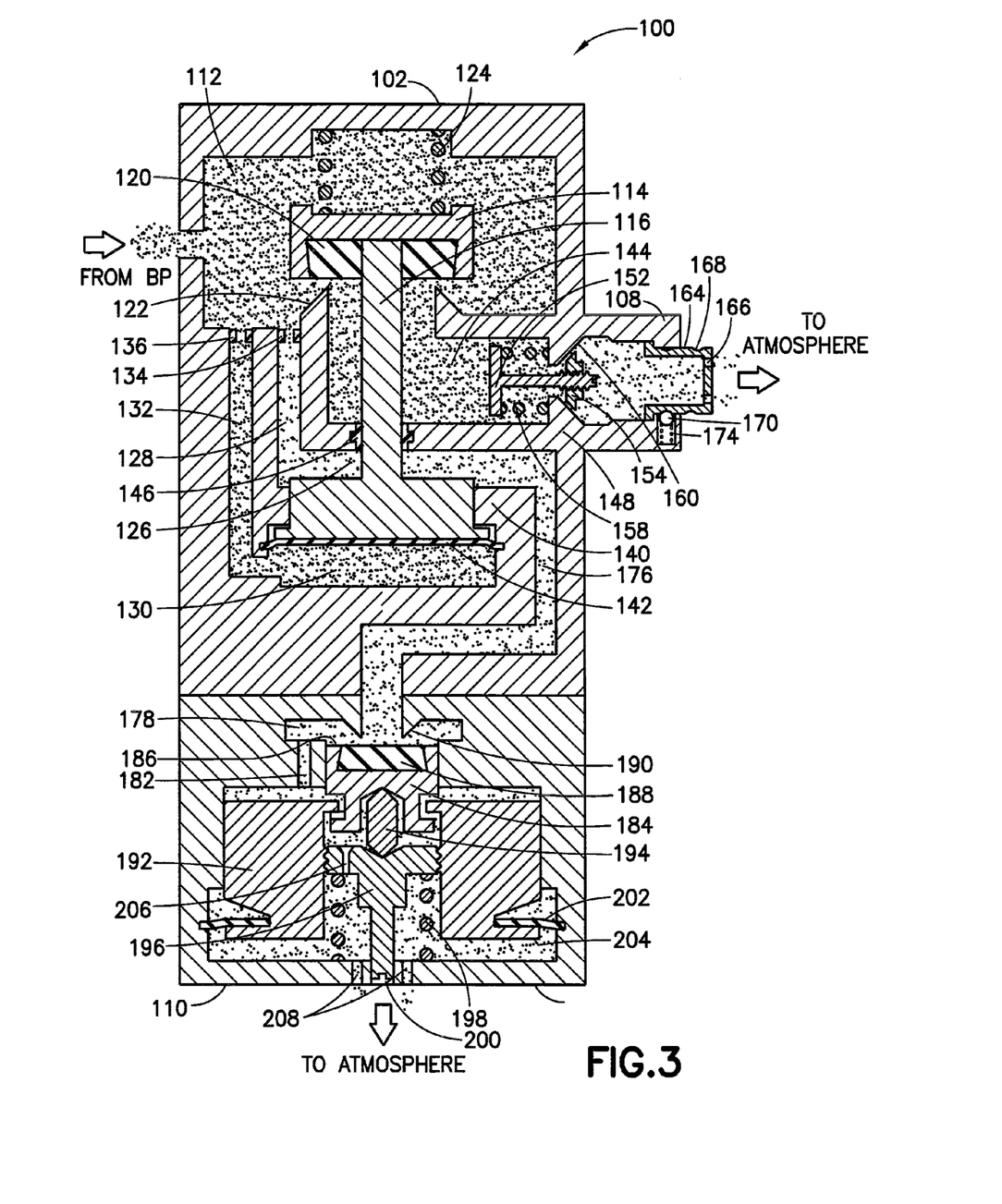
FIG. 3 is a schematic cross-sectional view of the derailment detector of FIG. 1 in an active mode.

Compressed air passing through the outlet chamber 144 of the discharge valve 108 upon activation of the derailment detector 100 engages a signal indicator 164 which is movably disposed within the terminal end of the outlet chamber 144. The signal indicator 164 is forced outward from a side of the discharge valve 108 to provide a visual indication that the derailment detector 100 has been activated. The signal indicator 164 defines a substantially tubular structure with one or more axial vents 166 extending through a terminal end of the signal indicator 164 and one or more radial vents 168 extending through a tubular sidewall of the signal indicator 164. In a first position, where signal indicator 164 is not activated, the signal indicator 164 is substantially received within the cavity of the outlet chamber 144. Upon activation of the derailment detector 100, compressed air acts on the terminal end of the signal indicator 164 and a portion of the compressed air is passed through the axial vents 166. Initially, as shown in FIG. 2, the signal indicator 164 is retained in the first position by a ball 170 received within a radial cavity extending radially into a sidewall of the signal indicator 164. The ball 170 is urged against the wall of the cavity by a spring 174. The pressure of the compressed air passing through the outlet chamber 144 is sufficient to push the signal indicator 164 such that the ball 170 is retracted from the cavity and the signal indicator 164 is advanced out of the outlet chamber 144 to a second position, as shown in FIG. 3. In the second position, radial vents 168 are advanced out of the outlet chamber 144 and compressed air from the outlet chamber 144 can pass through the axial vents 166 and the radial vents 168. Upon activation, signal indicator 164 is advanced relative to the outlet chamber 144 such that the ball 170 engages a second cavity. The signal indicator 164 is manually reset by pushing the signal indicator 164 into the outlet chamber 144 of the discharge valve 108 to overcome the force of the spring 174 exerted on the ball 170.

With continuing reference to FIG. 2, the lower assembly 110 is fluidly connected to the upper chamber 126 of the upper assembly 102 by a pipe 176. The pipe 176 delivers compressed air to a top pressure chamber 178 of the lower assembly 110. The top pressure chamber 178 is connected to a bottom pressure chamber 180 by a channel 182. A bottom valve 184 is slidably disposed between the top pressure chamber 178 and the bottom pressure chamber 180 adjacent to the channel 182. The bottom valve 184 includes a bottom valve face 186 having a second sealing element 188, such as a rubber seal, for sealing the bottom valve face 186 against a bottom valve seat 190. The second sealing element 188 is pressed against a bottom valve seat 190 when bottom valve 184 is closed to isolate the top pressure chamber 178 from receiving compressed air.

The bottom valve 184 is coupled to a vibrating mass 192 by a shock absorbing pin 194. The vibrating mass 192 has a generally solid cylindrical shape with an annular opening extending therethrough. The inner sidewall of the annular opening of the vibrating mass 192 is threaded to threadably receive an adjustment member 196. The vibrating mass 192 is suspended within the bottom pressure chamber 180 on a third elastic member 198, such as a helical coil spring, and is constrained to move in a vertical direction only. Stiffness of the vibrating mass 192 may be changed by adjusting the adjustment member 196 through an opening 200 provided on the bottom of the derailment detector 100. Stiffness of the vibrating mass 192 can be increased by turning the adjustment member 196 to compress the third elastic member 198. Conversely, stiffness of the vibrating mass 192 can be decreased by turning the adjustment member 196 to decompress the third elastic member 198. Stiffness of the vibrating mass 192 is directly proportional to the sensitivity of the derailment detector 100 to acceleration in the vertical direction. A lower portion of the vibrating mass 192 includes a diaphragm 202 that seals the bottom pressure chamber 180 from a lower outlet chamber 204. The bottom pressure chamber 180 is in fluid communication with the lower outlet chamber 204 through a choke 206. One or more vents 208 are provided on the bottom surface of the derailment detector 100 to vent the compressed air from the lower outlet chamber 204.

Having described the components of the derailment detector 100, a charging procedure to initialize the derailment detector 100 in a stand-by state shown in FIG. 2 will now be described. The derailment detector 100 is adapted to prevent self-activation during charging. Initially, compressed air from the brake pipe 106 is received inside the main chamber 112 which charges more quickly than upper and lower chambers 126, 130 of the upper assembly 102 because the compressed air is routed to the upper and lower chambers 126, 130 through the first and second chokes 134, 136. The first and second chokes 134, 136 prevent the upper and lower chambers 126, 130 from charging with compressed air at a faster rate than the main chamber 112 in order to prevent the lower valve face 138 from being pushed upward under pressure to unseat the upper valve face 118 from the valve seat 122. Such action is undesirable because compressed air would be vented from the main chamber 112 into the outlet chamber 144 and through the discharge valve 108 (see FIG. 3).

During charging, compressed air from the upper chamber 126 is introduced into the bottom pressure chamber 180 in the lower assembly 110 through the pipe 176. The stiffness of the vibrating mass 192 is sufficiently high to keep the bottom valve face 186 sealed against the bottom valve seat 190 and prevent the compressed air from being discharged through the lower assembly 110. In the stand-by state illustrated in FIG. 2, the lower assembly 110 is not activated and the derailment detector 100 is stable. Once fully charged such that the pressure inside the main chamber 112 and the upper and lower chambers 126, 130 reaches the normal operating pressure inside the brake pipe 106, the derailment detector 100 is operative in stand-by state and ready for detection of a derailment condition, as will be described next.

With reference to FIG. 3, two separate but related activations take place during activation of derailment detector 100. As described above, the lower assembly 110 is adapted for sensing acceleration in vertical and horizontal directions to cause the operation of the derailment detector 100 after a predetermined acceleration threshold is reached. The first activation involves an unbalancing of the bottom valve 184 to cause the bottom valve face 186 to unseat from the bottom valve seat 190. Bottom valve 184 is unbalanced as a result of a vertical and/or horizontal acceleration experienced by the railway vehicle. Sensitivity to acceleration in the vertical direction is controlled by the vibrating mass 192 while sensitivity to acceleration in the horizontal acceleration is controlled by the shock absorbing pin 194. For example, the stiffness of the vibrating mass 192 may be set to cause unbalancing of the bottom valve 184 via the shock absorbing pin 194 at a predetermined force between 6-11.5 g in a vertical direction. This means that the derailment detector 100 must activated after sensing vertical acceleration force exceeding 11.5 g. In other embodiments, unbalancing of the bottom valve 184 may be set to occur at any value between 6 g and 11.5 g.

Similarly, sensitivity to acceleration in a horizontal direction is controlled by the unbalancing of shock absorbing pin 194 in a horizontal direction relative, to the vibrating mass 192 that is fixed in a horizontal direction relative to the body of derailment detector 100. For example, the shock absorbing pin 194 may be set to cause unbalancing of the bottom valve 184 at a predetermined force of 30 g in a horizontal direction. This means that the derailment detector 100 must be activated after sensing horizontal acceleration force exceeding 30 g. Horizontal acceleration of less than 30 g would not cause an activation of the derailment detector 100. Sensitivity threshold of the derailment detector 100 to horizontal acceleration is higher than the sensitivity threshold to vertical acceleration in order to prevent false activations to horizontal acceleration experienced by the railway vehicle during coupling, starting, and stopping.

During the first stage of activation of the derailment detector 100, the bottom valve 184 is separated from the bottom valve seat 190 such that a quantity of compressed air is introduced into the bottom pressure chamber 180. The bottom valve 184 is kept open due to the advancing pressure such that compressed air fills the bottom pressure chamber 180 and passes to the lower outlet chamber through the channel 182 and the choke 206. Compressed air then passes through the one or more vents 208 and is exhausted into the atmosphere.

The second stage of activation of the derailment detector 100 occurs as a direct result of the first stage of activation described above. Due to the pressure drop in the upper chamber 126 caused by the passage of compressed gas through the pipe 176 into the lower assembly 110, a pressure equilibrium between the upper and lower chambers 126, 130 is unbalanced. Because the pressure in the lower chamber 130 is higher than the pressure in the upper chamber 126, lower valve face 138 is pushed upward. Because the lower valve face 138 is connected to the upper valve face 118 through the valve rod 116, the upper valve face 118 is also lifted upward against the force of the first elastic member 124. This movement causes the first sealing element 120 to move away from the valve seat 122 such that compressed air from the main chamber 112 can flow into the outlet chamber 144. The pressure inside the outlet chamber 144 acts against the spring retention member 156 of the outlet valve 150 to urge the outlet valve 150 to open and release the compressed air toward the signal indicator 164. Initially, the signal indicator 164 is retracted into the body of the discharge valve 108 (FIG. 2) and an initial quantity of compressed air is discharged into the atmosphere through axial vents 166. However, the compressed air inside the outlet chamber 144 urges the signal indicator 164 outward such that compressed air is discharged both through the axial vents 166 and the radial vents 168. Movement of the signal indicator 164 outside die outlet chamber 144 of the discharge valve 108 provides a visual indication that the derailment detector 100 has been activated. The outlet valve 150 is adjusted to release a predetermined percentage of brake pressure sufficient to give an indication that an abnormal condition (i.e., derailment) has occurred, but insufficient to cause braking of the railway vehicle. The predetermined drop in the normal brake pipe pressure gives an indication to the operator of the railway vehicle that an abnormal condition has occurred and that an appropriate corrective action should be taken so that the railway vehicle can be brought to a stop in a safe location. In one embodiment, the predetermined pressure drop in the brake pipe pressure may be 5% of the normal operating brake pipe pressure.

After the derailment detector 100 is activated, it must be reset before next use. In order to restore the main valve 114 to its initial, stand-by state, the derailment detector 100 is isolated from the brake pipe 106 so that the compressed air can be exhausted from the main chamber 112 and the outlet chamber 144. The derailment detector 100 is isolated from the brake pipe 106 by closing the isolating valve 104. Once the compressed air is exhausted from the main chamber 112, the main valve 114 is returned to its initial stand-by state by the restoring force of the first elastic member 124. Similarly, because the pressure in the top pressure chamber 178 of the lower assembly 110 is reduced to atmospheric pressure, bottom valve 184 is forced to its initial stand-by state by the restoring force of the third elastic member 198. After returning the signal indicator 164 into its initial position inside the discharge valve 108, the isolating valve 104 may be opened to introduce the compressed air from the brake pipe 106 into the main chamber 112 and return the derailment detector 100 into its stand-by state shown in FIG. 2.

While embodiments of a derailment detector 100 and methods of operation thereof were provided in the foregoing description, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A derailment detector for a railway vehicle, the derailment detector comprising:
a housing in fluid communication with a brake pipe of the railway vehicle to receive compressed air from a pneumatic braking system;
a main chamber disposed within the housing and pressurized by the compressed air, the main chamber having a main valve;
a shock detection assembly adapted for detecting an acceleration indicative of a derailment condition and activating the main valve upon detection of the acceleration indicative of the derailment condition; and
a discharge valve in selective fluid communication with the main chamber,
wherein, upon detection of the acceleration indicative of the derailment condition, the discharge valve is operative for discharging a predetermined percentage of full operating brake pipe pressure of the compressed air from the main chamber to indicate that the derailment condition has occurred, but not release a percentage of the full operating brake pipe pressure sufficient to affect braking of the railway vehicle.

2. The derailment detector of claim 1, wherein the discharge valve further comprises a signal indicator movable relative to the discharge valve by the discharge of the predetermined percentage of full operating brake pipe pressure to indicate the occurrence of the derailment condition.

3. The derailment detector of claim 1, wherein the predetermined percentage of full operating brake pipe pressure is 3-8%.

4. The derailment detector of claim 3, wherein the predetermined percentage of full operating brake pipe pressure is 5%.

5. The derailment detector of claim 1, wherein the discharge valve is adjustable to select the percentage of full operating brake pipe pressure discharged from the pneumatic braking system.

6. The derailment detector of claim 1, further comprising an isolation valve to selectively control a flow of compressed air from the brake pipe to the housing.

7. The derailment detector of claim 1, wherein the housing further comprises an upper assembly having the main chamber and a lower assembly having the shock detection assembly.

8. The derailment detector of claim 7, wherein the upper assembly is in fluid communication with the lower assembly.

9. The derailment detector of claim 1, wherein the shock detection assembly includes a vibrating mass suspended on a spring, the vibrating mass adapted for detecting acceleration in a substantially vertical direction.

10. The derailment detector of claim 9, wherein the vibrating mass is adjustable to select a vertical acceleration at which the discharge valve is activated.

11. A derailment detector comprising:
a discharge valve adapted to discharge a predetermined percentage of full operating brake pipe pressure of a railway vehicle in response to a detection of an acceleration indicative of a derailment condition, but not release a percentage of the full operating brake pipe pressure sufficient to affect braking of the railway vehicle.

12. The derailment detector of claim 11, wherein the discharge valve further comprises a signal indicator movable relative to the discharge valve by the discharge of the predetermined percentage of full operating brake pipe pressure to indicate the occurrence of the derailment condition.

13. The derailment detector of claim 11, wherein the predetermined percentage of full operating brake pipe pressure is 3-8%.

14. The derailment detector of claim 13, wherein the predetermined percentage of full operating brake pipe pressure is 5%.

15. The derailment detector of claim 11, wherein the discharge valve is adjustable to select the percentage of full operating brake pipe pressure discharged from the pneumatic braking system.

16. The derailment detector of claim 11, wherein the discharge valve is activated by a shock detection assembly adapted for detecting an acceleration indicative of the derailment condition.

17. A method of detecting a derailment condition in a railway vehicle and indicating the occurrence of the derailment condition, the method comprising the steps of:

pressurizing a derailment detector with compressed air;
detecting an acceleration indicative of the derailment condition; and
discharging a predetermined percentage of full operating brake pipe pressure of the compressed air from the derailment detector to indicate the occurrence of the derailment condition, but not release a percentage of the full operating brake pipe pressure sufficient to affect braking of the railway vehicle.

18. The method of claim 17, wherein the acceleration indicative of the derailment condition is detected by a shock detection assembly.

19. The method of claim 17, wherein the predetermined percentage of full operating brake pipe pressure of compressed air is discharged through a discharge valve.

\* \* \* \* \*